US008731061B2

(12) United States Patent
Joch et al.

(10) Patent No.: US 8,731,061 B2
(45) Date of Patent: *May 20, 2014

(54) MOTION VECTOR REFINEMENT FOR MPEG-2 TO H.264 VIDEO TRANSCODING

(75) Inventors: Anthony Peter Joch, Waterloo (CA); Michael D. Gallant, Kitchener (CA)

(73) Assignee: LSI Corporation, San Jose, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 13/546,159

(22) Filed: Jul. 11, 2012

(65) Prior Publication Data

US 2012/0307907 A1 Dec. 6, 2012

Related U.S. Application Data

(62) Division of application No. 11/703,482, filed on Feb. 7, 2007, now Pat. No. 8,265,157.

(51) Int. Cl.
*H04N 7/50* (2006.01)

(52) U.S. Cl.
USPC ...... 375/240.16; 382/236; 382/239; 382/243; 705/51; 705/53; 705/54; 709/229; 455/433; 455/455

(58) Field of Classification Search
CPC ........................................ H04N 7/50
USPC ................................... 375/240.16
See application file for complete search history.

(56) References Cited

U.S. PATENT DOCUMENTS

| 6,072,833 | A * | 6/2000 | Yamauchi | 375/240.16 |
|---|---|---|---|---|
| 6,501,799 | B1 | 12/2002 | Kohn | 375/240.16 |
| 6,704,360 | B2 | 3/2004 | Haskell et al. | 375/240.12 |
| 6,826,231 | B2 | 11/2004 | Takahashi et al. | 375/240.16 |
| 7,072,398 | B2 * | 7/2006 | Ma | 375/240.16 |
| 7,224,732 | B2 | 5/2007 | Takahashi et al. | 375/240.16 |
| 7,366,242 | B2 * | 4/2008 | Demos | 375/240.29 |
| 7,580,456 | B2 | 8/2009 | Li et al. | 375/240 |
| 7,782,951 | B2 * | 8/2010 | Muthukrishnan et al. | 375/240.16 |
| 8,155,195 | B2 | 4/2012 | Regunathan et al. | 375/240.16 |
| 2004/0057520 | A1 | 3/2004 | Sun | 375/240.16 |
| 2005/0201463 | A1 | 9/2005 | Lee et al. | 375/240.16 |
| 2005/0207663 | A1 * | 9/2005 | Zeng et al. | 382/236 |
| 2005/0286632 | A1 * | 12/2005 | Van Der Schaar et al. | 375/240.16 |
| 2006/0039473 | A1 | 2/2006 | Filippini et al. | 375/240.16 |

(Continued)

OTHER PUBLICATIONS

Adaptive Motion Tracking Block Matching Algorithms for Video Coding |Xu et al|Oct. 1999|pp. 1025-1029|.*

(Continued)

*Primary Examiner* — Mahfuzur Rahman
(74) *Attorney, Agent, or Firm* — Christopher P. Maiorana, PC

(57) ABSTRACT

A method for transcoding that includes (A) generating a decoded frame by decoding an MPEG-2 input video stream, the decoded frame including decoded macroblocks; (B) determining a search center for encoding a current macroblock corresponding to a pair of the decoded macroblocks on consecutive macroblock rows, when (i) the encoding uses a predictive field mode and (ii) a current field being encoded is a second field of a current frame that has a first field as a reference field, the search center is a temporally scaled version of a decoded motion vector from an upper or a lower macroblock in the pair; (C) generating a refined motion vector by searching in a temporal search direction about the search center; and (D) generating an H.264 output video stream by encoding the current macroblock based on the refined motion vector.

6 Claims, 17 Drawing Sheets

(56) References Cited

U.S. PATENT DOCUMENTS

| | | | |
|---|---|---|---|
| 2006/0245497 A1 | 11/2006 | Tourapis et al. | 375/240.16 |
| 2006/0285595 A1* | 12/2006 | Ha et al. | 375/240.16 |
| 2007/0121728 A1 | 5/2007 | Wang et al. | 375/240.18 |
| 2007/0165957 A1* | 7/2007 | De Haan et al. | 382/236 |
| 2007/0223581 A1 | 9/2007 | Iguchi | 375/240.12 |
| 2007/0237232 A1 | 10/2007 | Chang et al. | 375/240.16 |
| 2008/0043831 A1 | 2/2008 | Sethuraman et al. | 375/240 |

OTHER PUBLICATIONS

Pereira, Rochelle, "Efficient Transcoding of an MPEG-2 Bit Stream to an H.264 Bit Stream", Dissertation for Master of Science in Electrical Engineering from The University of Texas at Arlington, Dec. 2005, 20 pages.

* cited by examiner

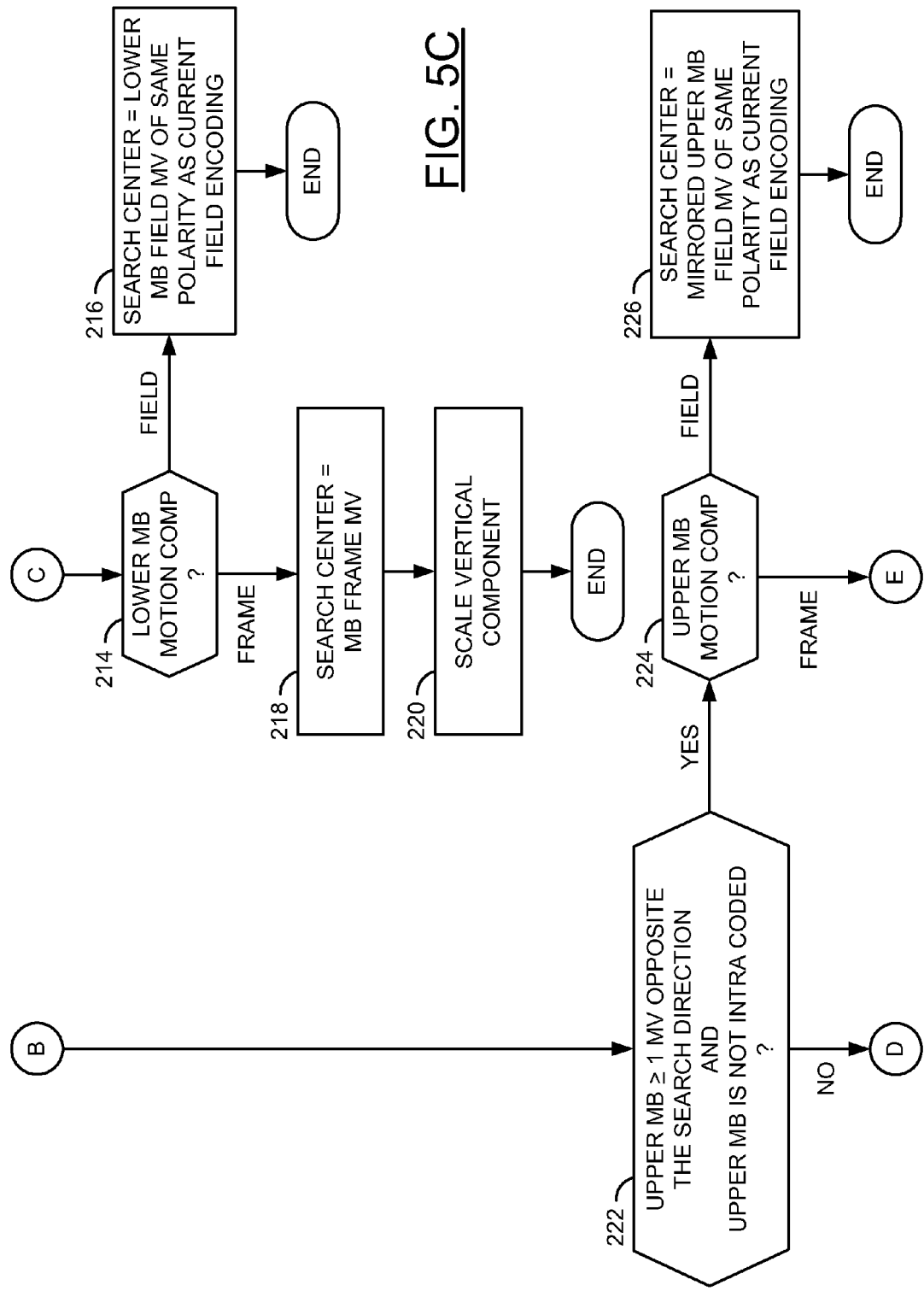

260

| D | B | C |
|---|---|---|
| A | CURRENT MB X | E |
| F | G | H |

FIG. 6

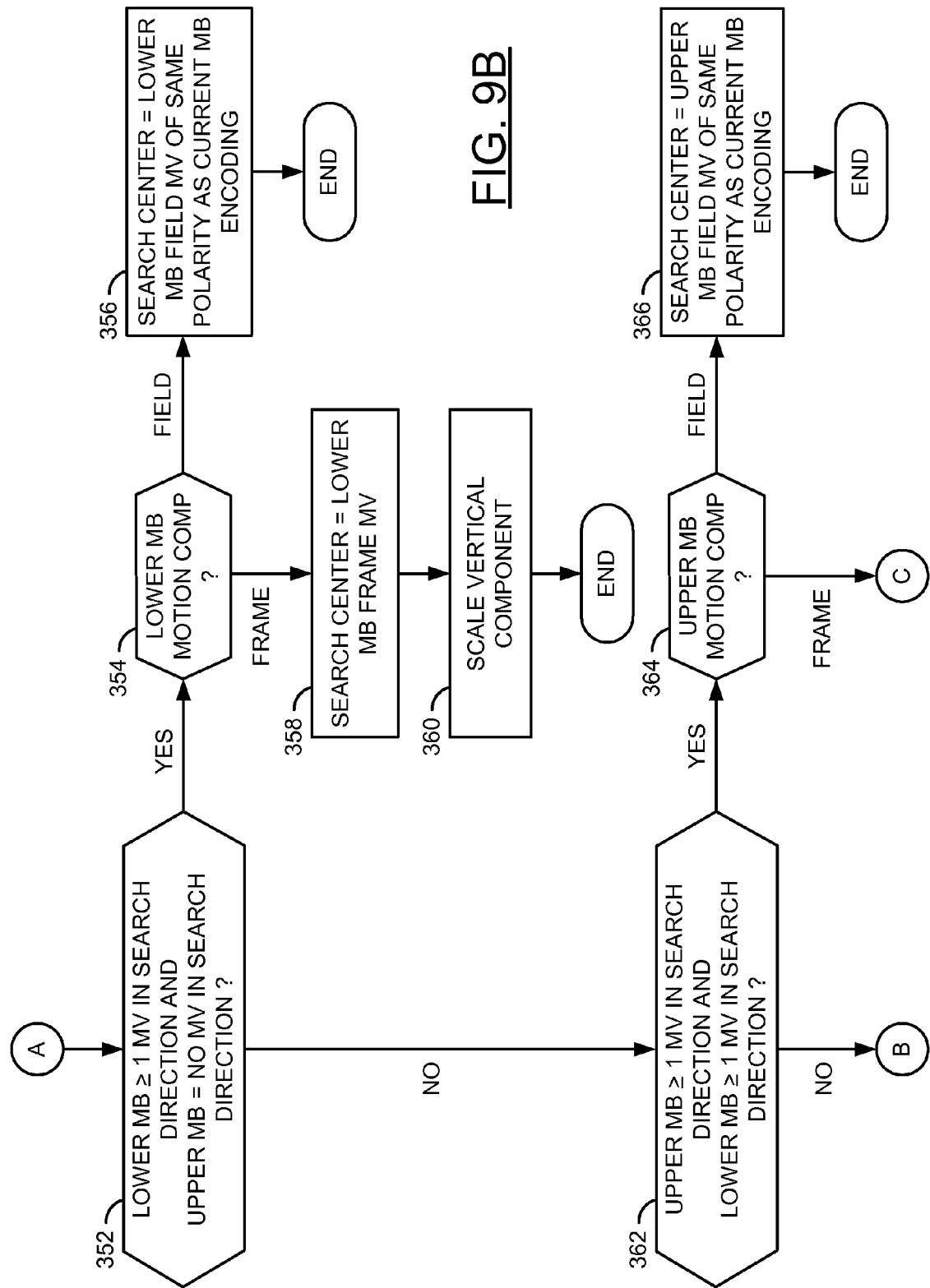

MOTION VECTOR REFINEMENT FOR MPEG-2 TO H.264 VIDEO TRANSCODING

This is a divisional of U.S. Ser. No. 11/703,482, filed, Feb. 7, 2007, now U.S. Pat. No. 8,265,157 which is incorporated by reference.

FIELD OF THE INVENTION

The present invention relates to video transcoding generally and, more particularly, to a motion vector refinement for MPEG-2 to H.264 video transcoding.

BACKGROUND OF THE INVENTION

A significant amount of video content is currently available in the MPEG-2 format. Furthermore, a large number of both cable set top boxes and satellite set top boxes that only support the MPEG-2 format are currently deployed. Therefore, compatibility with the MPEG-2 standard will remain important for years to come.

An H.264/MPEG4-AVC digital video standard (H.264 for short) is an emerging new format for consumer video, particularly in both new broadcast and High-Definition (HD) Digital Versatile Disk (DVD) applications. As H.264-based content and products become available, transcoding in both directions between the H.264 standard and the MPEG-2 standard will become widely used capabilities. Anticipated consumer applications include reception of MPEG-2 broadcasts by a personal video recorder (PVR) and transcoding to H.264 for saving on disk storage space. Professional applications are also widely anticipated. Such applications include MPEG-2 to H.264 transcoding for content received at a headend facility in the MPEG-2 format converted into the H.264 format for distribution at a lower bandwidth. In another example, MPEG-2 to H.264 transcoding could be used to save bandwidth for expensive transmission media such as satellite links. Furthermore, the consumer market is a large market with strict complexity/cost constraints that will benefit substantially from an efficient and effective transcoding technology.

Conventional transcoding solutions use some or all of the following techniques. Basic transcoding is achieved by decoding in one format and then re-encoding in another. Information from the bitstream being decoded is reused to seed the encoding of the other format. Picture-type decisions are reused so that a Group of Pictures structure of the transcoded bitstream is the same as the original stream. A look ahead in the compressed original bitstream is used for rate-control of the bitstream being encoded. An MPEG-2 bitstream is decoded in a native macroblock order (i.e., simple raster scan) and encoded into an H.264 bitstream in a simple raster scan order or in a macroblock pair raster scan order. Mode decisions of individual macroblocks are reused in determining the mode of corresponding macroblocks in the transcoded bitstream. Furthermore, motion compensation partitioning decisions are reused so that only the subset of partition sizes that are available in MPEG-2 is used in the H.264 bitstream.

The conventional solutions are inefficient for transcoding between video standards in cases where one format consistently uses either field coding or frame coding within an independently decodable sequence of pictures (i.e., MPEG-2 GOP) and the other format may switch on a picture basis between field, frame, and frame MBAFF coding (i.e., H.264). Inefficiencies are also experienced where one format has multiple ways to partition a macroblock for motion compensation (i.e., H.264 16×16, 8×16, 16×8, 8×8, etc. partitions) and the other format has only a few options (i.e., MPEG-2 16×16 or 16×8 field partitions). Cases where one format supports quarter-pixel accurate motion compensation and the other format only supports half-pixel accurate motion compensation can result in weak transcoding. In addition, efficiency suffers where one format uses a field/frame macroblock decision independently for each macroblock (i.e., MPEG-2) and the other format uses a field/frame macroblock decision for a macroblock pair (i.e., H.264).

Further, conventional solutions are not optimal for implementation on hardware architectures that contain independent dedicated hardware units for parallel motion estimation, MPEG-2 decoding and H.264 encoding. The conventional solutions result in non-optimal coding performance by implementing complexity reduction methods that are unnecessary for such hardware architectures. Such methods include maintaining the predictions as in the decoded bitstream and re-coding only the transform-domain residual. The half-pixel accurate MPEG-2 motion vectors are reused without refining the H.264 motion vectors to quarter-pixel accuracy. Furthermore, the motion compensation partition of the decoded bitstream is reused instead of performing motion estimation refinement for all possible motion compensation partitions available in H.264. As such, the conventional methods result in sub-optimal coding efficiency in the H.264 output stream because the more powerful prediction capabilities of the H.264 standard over the MPEG-2 standard are not being utilized.

SUMMARY OF THE INVENTION

The present invention concerns a method for transcoding. The method generally comprises the steps of (A) generating a decoded frame by decoding an input video stream in an MPEG-2 format, the decoded frame including a plurality of decoded macroblocks; (B) determining a current search center to be used in encoding a current macroblock into an H.264 format, the current macroblock corresponding to a pair of the decoded macroblocks on consecutive macroblock rows, wherein when (i) the encoding uses a predictive field mode and (ii) a current field being encoded comprises a second field of a current frame and has a first field of the current frame as a reference field, the current search center comprises a temporally scaled version of a decoded motion vector from one of an upper macroblock of the pair and a lower macroblock in the pair; (C) generating a refined motion vector by searching in a temporal search direction about the current search center; and (D) generating an output video stream in the H.264 format by the encoding of the current macroblock based on the refined motion vector.

The objects, features and advantages of the present invention include providing a motion vector refinement for MPEG-2 to H.264 video transcoding that may (i) result in an efficient transcoding, (ii) refine motion vectors to quarter-pel accuracy, (iii) reduce the partition sizes, (iv) utilize MPEG-2 coding mode information in the H.264 encoding and/or (v) transcode intra-prediction macroblocks to inter-prediction macroblocks.

BRIEF DESCRIPTION OF THE DRAWINGS

These and other objects, features and advantages of the present invention will be apparent from the following detailed description and the appended claims and drawings in which:

FIGS. 5A-5E are a flow diagram of an example method of selecting search centers for field encoding;

FIG. 6 is a block diagram of an example layout of multiple macroblocks in a raster scan order;

FIGS. 9A-9E are a flow diagram of an example method of selecting search centers for macroblock-adaptive field/frame encoding using field-based motion compensation.

DETAILED DESCRIPTION OF THE PREFERRED EMBODIMENTS

Figure 1:
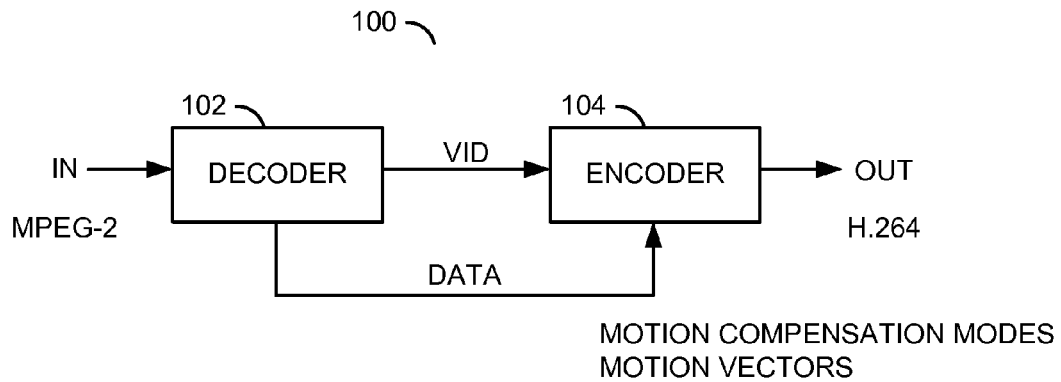
FIG. 1 is a functional block diagram of a first system in accordance with a preferred embodiment of the present invention.

Referring to FIG. 1, a functional block diagram of a first system 100 is shown in accordance with a preferred embodiment of the present invention. The first system (or circuit) 100 may be implemented as a video transcoder. The system 100 generally comprises a decoder module (or function) 102 and an encoder module (or function) 104. A signal (e.g., IN) may be received by the module 102. The module 102 may generate a signal (e.g., VID) and generate one or more signals, generally represented by a signal (e.g., DATA). The module 104 may receive the signals VID and DATA. A signal (e.g., OUT) may be presented by the module 104.

The signal IN may be a compressed digital video bitstream compliant with a starting video standard (or format). The starting video standard may be an MPEG-2 standard. The signal VID may be a non-compressed digital video signal in an interlaced format or a progressive format. The signal OUT may be a compressed digital video bitstream compliant with an ending video standard (or format). The ending video format may be an H.264 recommendation.

The signal DATA generally comprises one or more types of information and/or indicators extracted from the signal IN during a decoding operation. The information/indicators in the signal. DATA may be useful in coding the signal VID during an encoding operation. The signal DATA may convey one or more of the following motion compensation modes, motion vectors and/or similar information obtained while decoding the signal IN.

Implementation of the system 100 may comprise a single chip (or die) in (on) which both the module 102 and the module 104 may be formed. In another embodiment, the system 100 may comprise two chips (or die). A first chip of the system 100 may comprise the module 102. A second chip of the system 100 may comprise the module 104.

Figure 2:
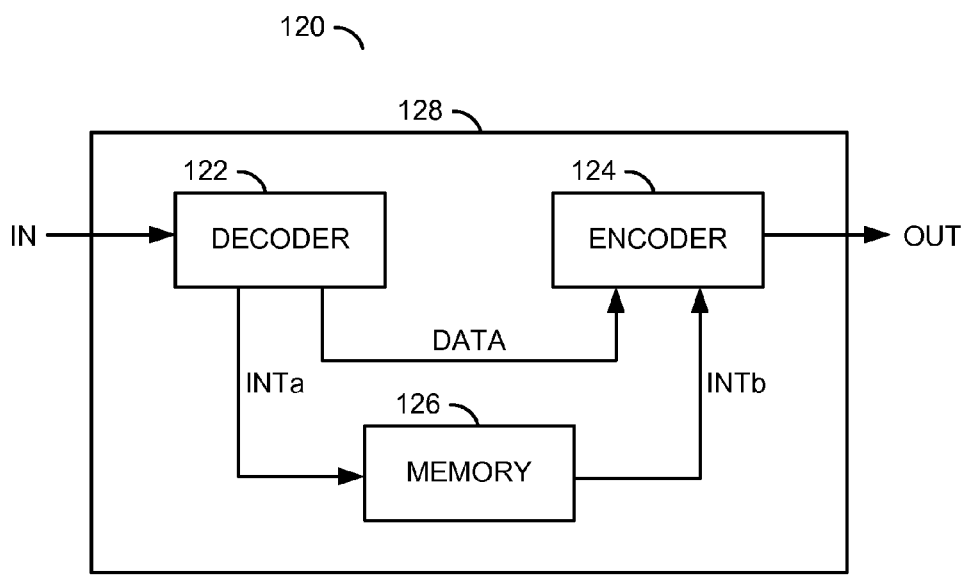
FIG. 2 is a functional block diagram of a second system.

Referring to FIG. 2, a functional block diagram of a second system 120 is shown. The second system (or circuit) 120 may be implemented as a video transcoder. The second system 120 generally comprises a decoder module (or function) 122, an encoder module (or function) 124 and a memory module (or function) 126. The module 122 may receive the signal IN and generate the signal DATA. An intermediate signal (e.g., INTa) may be presented by the module 122 to the module 126. The module 124 may receive the signal DATA and present the signal OUT. A second intermediate signal (e.g., INTb) may be received by the module 124 from the module 126.

The intermediate signals INTa and INTb may be used to transfer pixel information from the module 122 to the module 124. The pixel information may be buffered in the module 126 until utilized by the module 124.

In some embodiments, the system 120 may be implemented as a single chip (or die) 128. The chip 128 may comprise the module 122, the module 124 and the module 126. The module 126 and the intermediate signals INTa and INTb may provide a capability to transfer partially decoded pictures from the module 122 to the module 124 before the module 122 has completed decoding of the entire picture. As such, the module 124 may operate substantially in parallel with the module 122 by operating on the same picture substantially simultaneously. The module 126 may also be capable of temporarily buffering one or more fully decoded pictures. Therefore, the module 122 may operate at least one picture ahead of the module 124 with the module 126 storing all indicators for all macroblocks of the buffered pictures.

Figure 3:
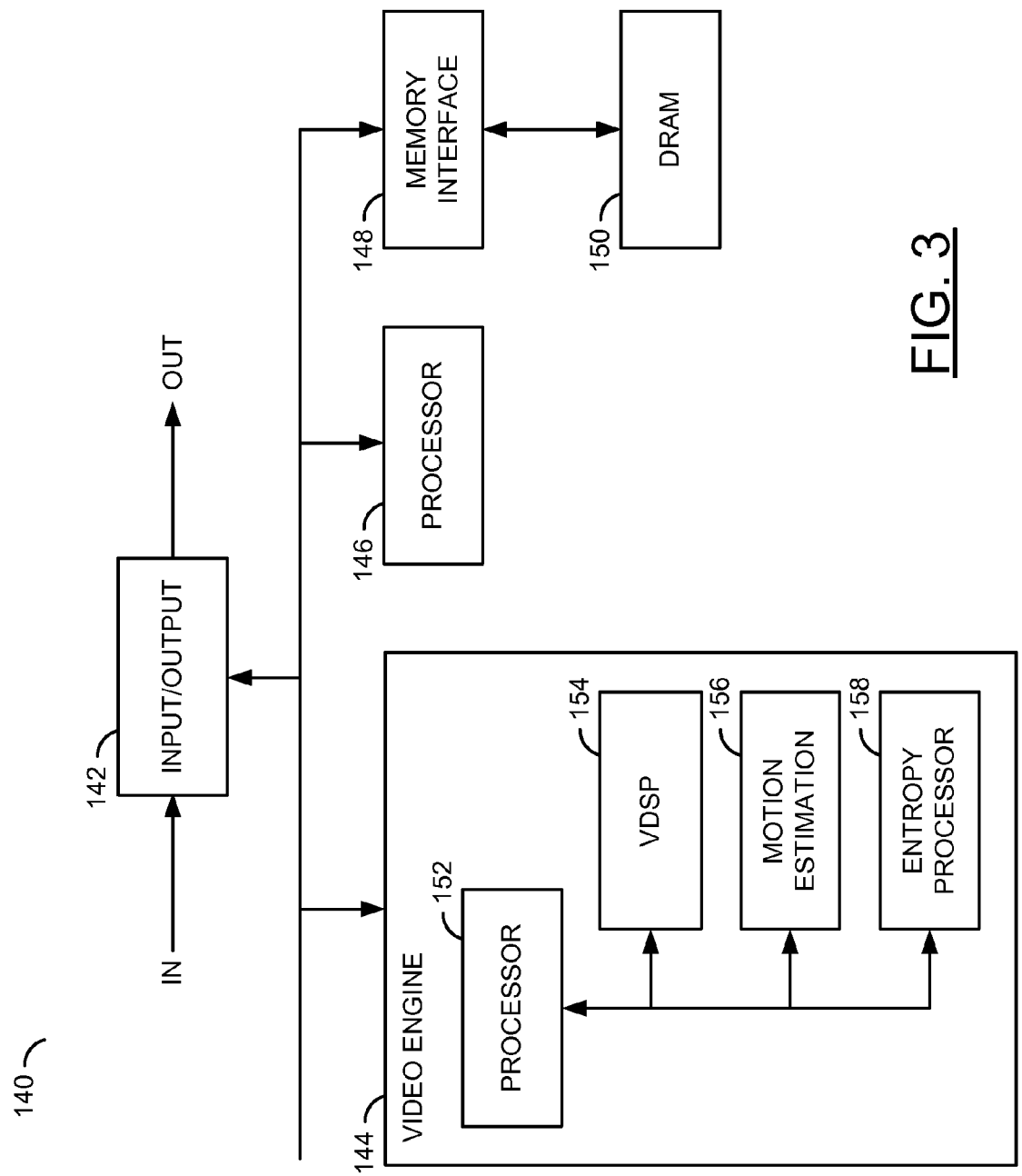
FIG. 3 is a block diagram of an example implementation of a third system.

Referring to FIG. 3, a block diagram of an example implementation of a third system 140 is shown. The system (or circuit) 140 may be configured as a video transcoder. The system 140 may implement the system 100 and/or the system 120. The system 140 generally comprises a module (or circuit) 142, a module (or circuit) 144, module (or circuit) 146, a module (or circuit) 148 and a module (or circuit) 150. The module 142 may be coupled to the module 144, the module 146 and the module 148 by a local bus. The module 148 may be directly connected to the module 150. The signal IN may be received by the module 142. The signal OUT may be presented by the module 142.

The module 142 may be implemented as an input/output module. The module 142 may be operational to receive the signal IN as encoded in the starting video format and present the signal OUT as encoded in the ending video format.

The module 144 may by implemented as a video engine. The module 144 may be operational to perform some or all of the video decoding and/or video encoding of the transcoding operations. The module 144 generally comprises a module (or circuit) 152, a module (or circuit) 154, a module (or circuit) 156 and a module (or circuit) 158.

The module 146 may be implemented as one or more processor modules. The module 146 may be operational to perform a portion of the transcoding operation in support of the module 144. In some embodiments, one of the processors may be a SPARC processor. In other embodiments, one of the processors may be a MIPS processor. Other processor configurations may be implemented to meet the criteria of a particular application.

The module 148 may be implemented as a memory interface module. The module 148 may be operational to provide communicate with, and control of the module 150. The modules 142, 144, 146 and 148 may be fabricated in (on) a first chip (or die), whereas the module 150 may be fabricated in (on) a second chip (or die). As such, the module 148 may also be configured to provide high-speed inter-chip drive capabilities.

The module 150 may be implemented as a dynamic random access memory (DRAM). The module 150 may be operational to store or buffer large amounts of information consumed and generated by the decoding operations and the encoding operations of the system 140. The module 150 may be implemented as a double data rate (DDR) memory. Other memory technologies may be implemented to meet the criteria of a particular application.

The module 152 may be implemented as a SPARC processor. The module 152 may be operational to perform portions of the decoding operations and the encoding operations in software. The module 152 may also be operational to control the module 154, the module 156 and the module 158. Other types of processors may be implemented to meet the criteria of a particular application.

The module 154 may be implemented as a video digital signal processor (VDSP). The module 154 may be operational to perform portions of the decoding operations and portions of the encoding operations in hardware. The module 154 may be controlled by the module 152.

The module 156 may be implemented as a motion estimation module. The module 156 is generally operational to estimate the motion of a given macroblock down to a quarter-pel resolution. The module 156 generally has an application-specific, hardware-only design. A search area used in the motion estimation may be controlled by the module 152. The search area may include a normal search range and a reduced (e.g., refinement) search range.

The module 158 may be implemented as an entropy processor. The module 158 may be operational to entropy code the compressed digital video to create the signal OUT. In some embodiments, the entropy coding may be performed in accordance with the H.264 recommendation. Other coding formats may be implemented to meet the criteria of a particular application.

The first system 100, the second system 120 and/or the third system 140 (generically referred to as a system) may be operational to convert the signal IN from an original MPEG-2 video standard (or format) to an H.264 video standard (or format). Several capabilities and/or options may be implemented in the system per the present invention to make the transcoding efficient. A basic option may be to reuse the MPEG-2 motion vectors for each macroblock being encoded so that the motion compensated predictions for H.264 may be very similar to the predictions used for the original MPEG-2 encoding.

Another option provides inter prediction of the H.264 macroblocks in the signal OUT for the MPEG-2 macroblocks in the signal IN that use intra prediction to take advantage of the improved motion compensation model supported in H.264 relative to MPEG-2. The improvements generally include smaller motion compensation block partitions and quarter-pel accurate motion vectors. In order to make effective use of the improved features to increase coding efficiency, some motion estimation specific to H.264 may be performed.

Since the MPEG-2 motion vectors are generally available and capture the significant motion in a sequence, performing motion estimation on a large search range in the H.264 encoding could be overly complex and wasteful. Instead, the MPEG-2 vectors may be used to determine the search centers for small refinement searches that may allow for refined motion vectors that take advantage of the improved motion compensated prediction model in H.264 (e.g., allow smaller block partitions and quarter-pel accurate motion vectors). In one example, the refinement search may be limited to an area up to eight integer pixels from the search center. Other refinement search ranges may be implemented to meet the criteria of a particular application.

Interlaced source content is commonly coded in MPEG-2 as interlaced frame pictures. However, the present invention generally supports transcoding that may result in progressive coding, macroblock-adaptive field/frame encoding and/or field picture coding of the pictures in H.264. Some consideration should be put into the mapping of the motion vectors from an MPEG-2 interlaced frame to an H.264 picture with a different picture structure. Furthermore, the MPEG-2 macroblocks that are intra-predicted generally contain no motion vector information, yet a search center may be selected for the intra macroblock to allow the possibility of inter prediction in H.264. The present invention addresses the selection of search centers for H.264 motion estimation in such nontrivial cases.

A general principle for selecting the search center is to use an MPEG-2 motion vector that most closely matches the search type that may be perform for the H.264 encoding in terms of a search direction and a field/frame motion compensation mode. For predicted (P)-pictures, the search direction may always "forward" (e.g., the prediction is generally from a previous picture in the display order forward in time to the current picture). For bidirectional (B)-pictures, a forward prediction and a "backward" prediction (e.g., the prediction may be from a subsequent picture in the display order) are generally performed. MPEG-2 frame motion vectors generally have a motion compensated prediction that uses both fields of a reference frame. MPEG-2 field motion vectors usually specify a motion compensated prediction that may be derived from a single field of a reference frame.

Figure 4:
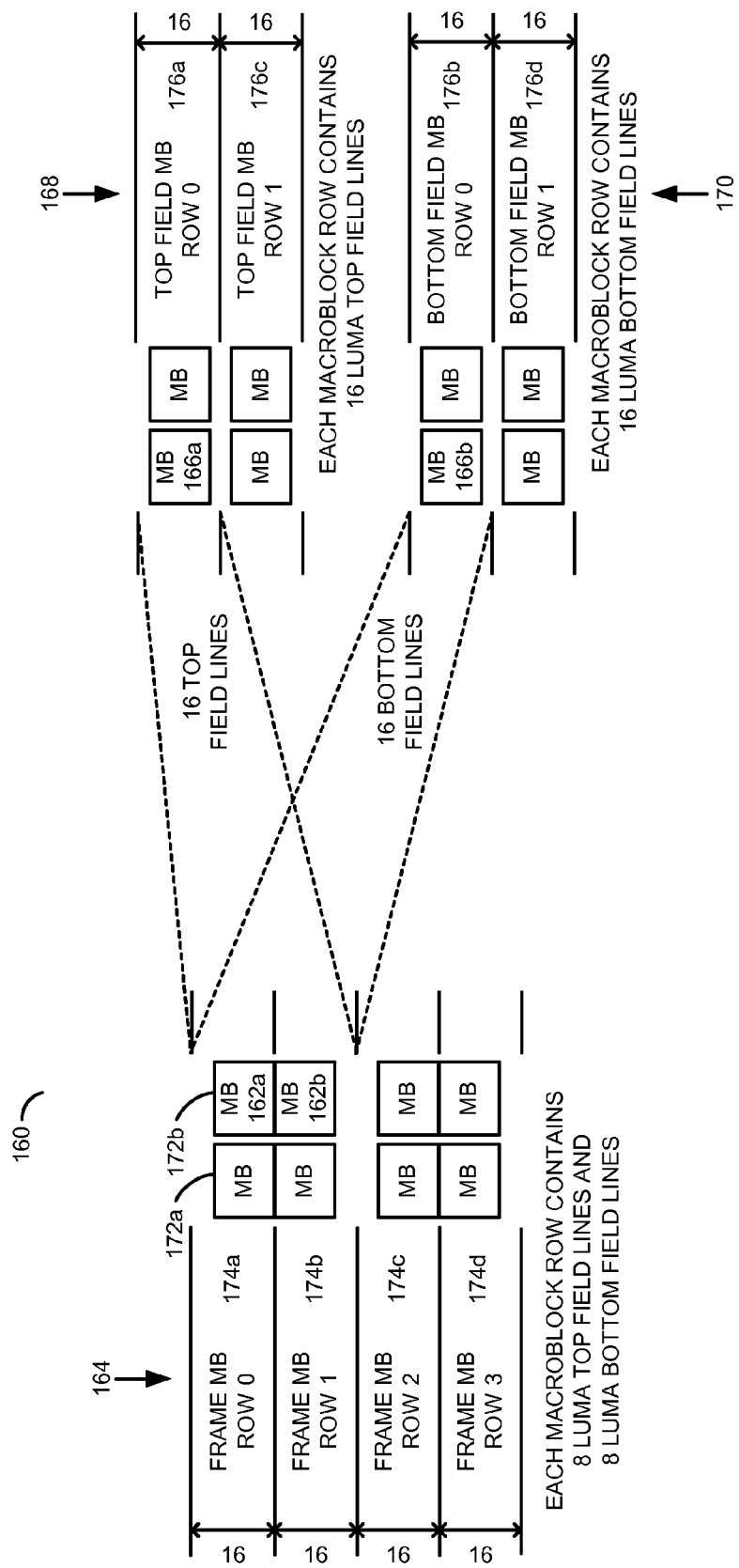
FIG. 4 is a diagram of an example mapping of macroblock pairs from a frame picture decoding to a field picture encoding.
Figure 5A:
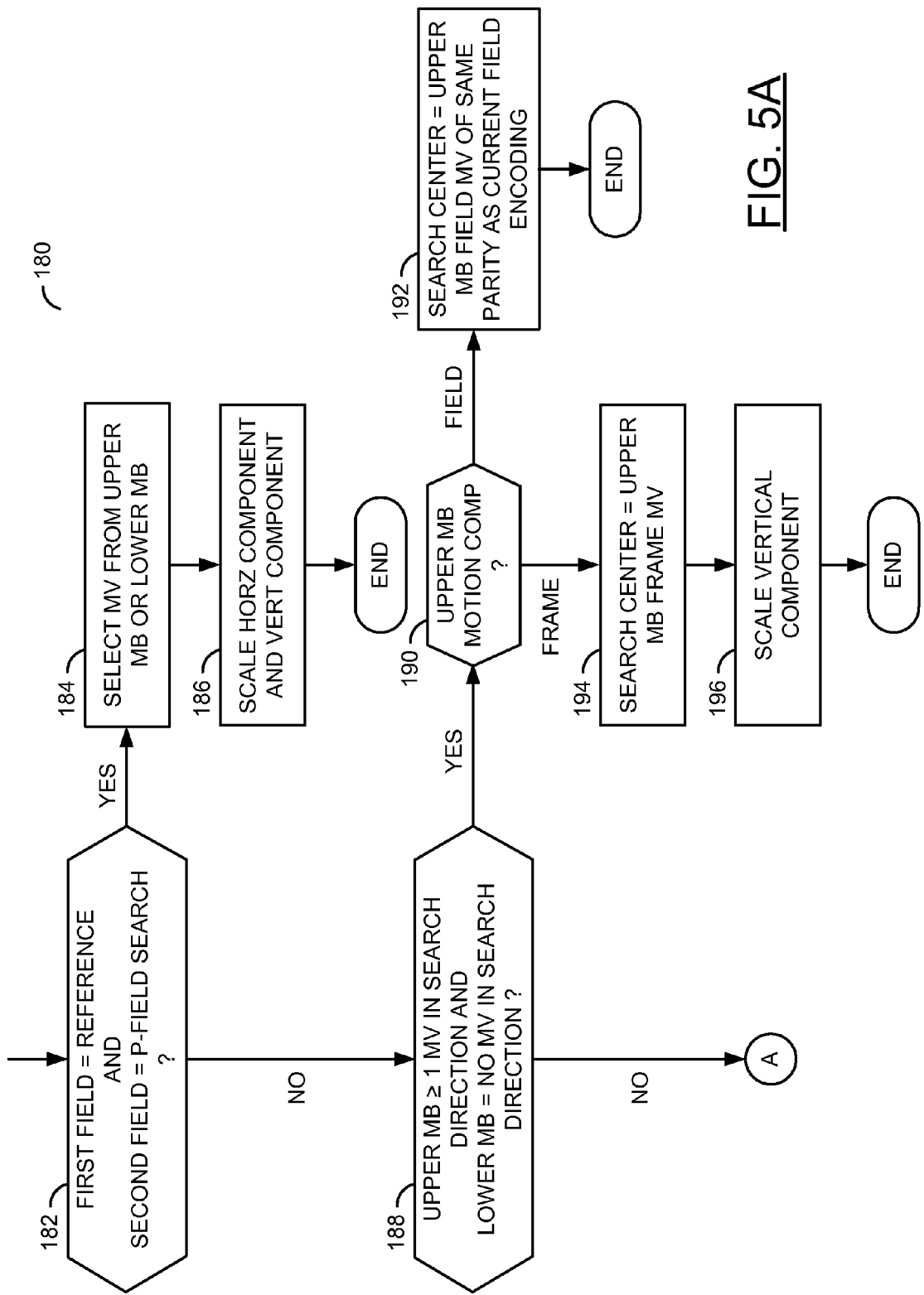
Figure 5B:
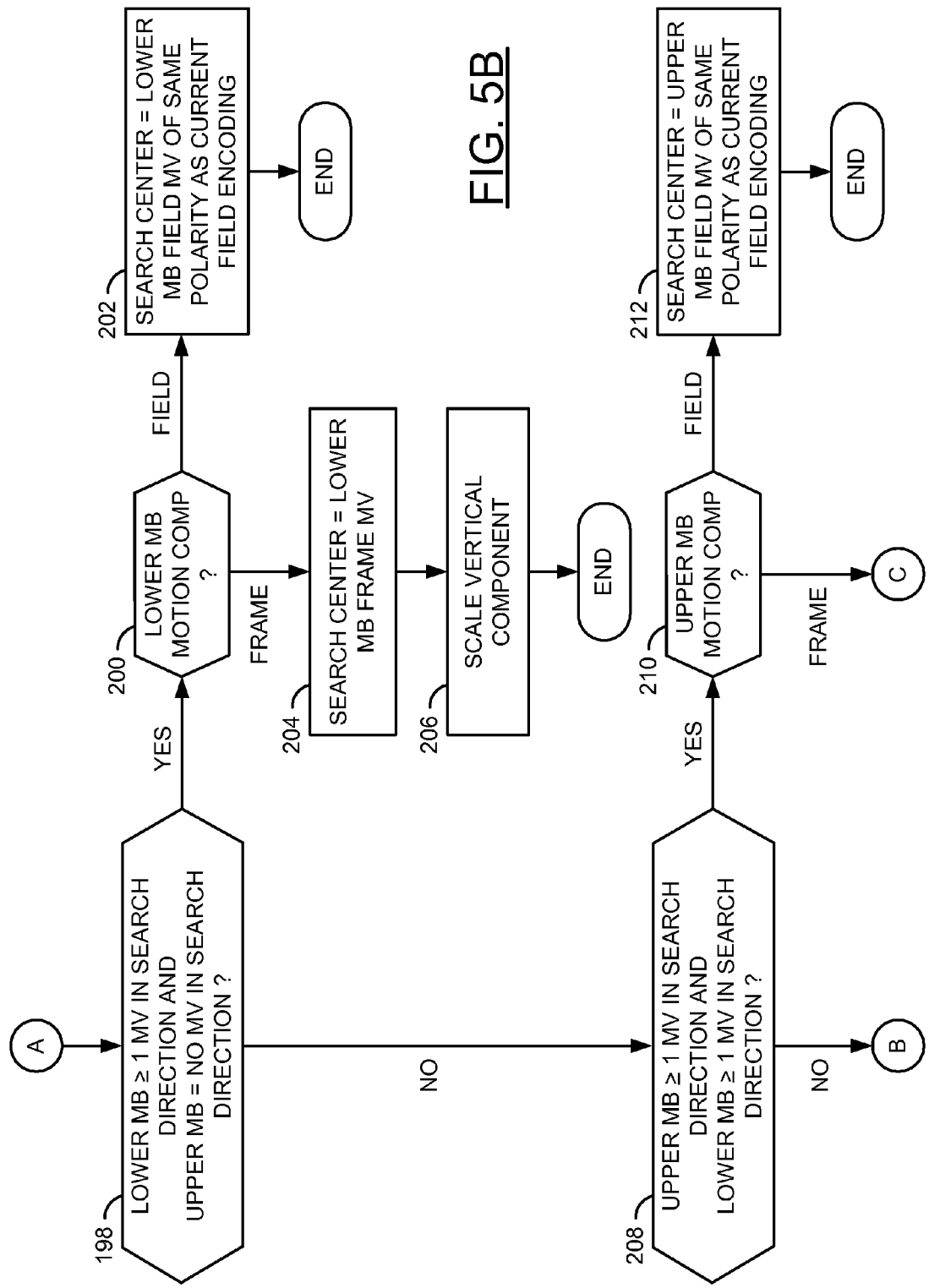
Figure 5D:
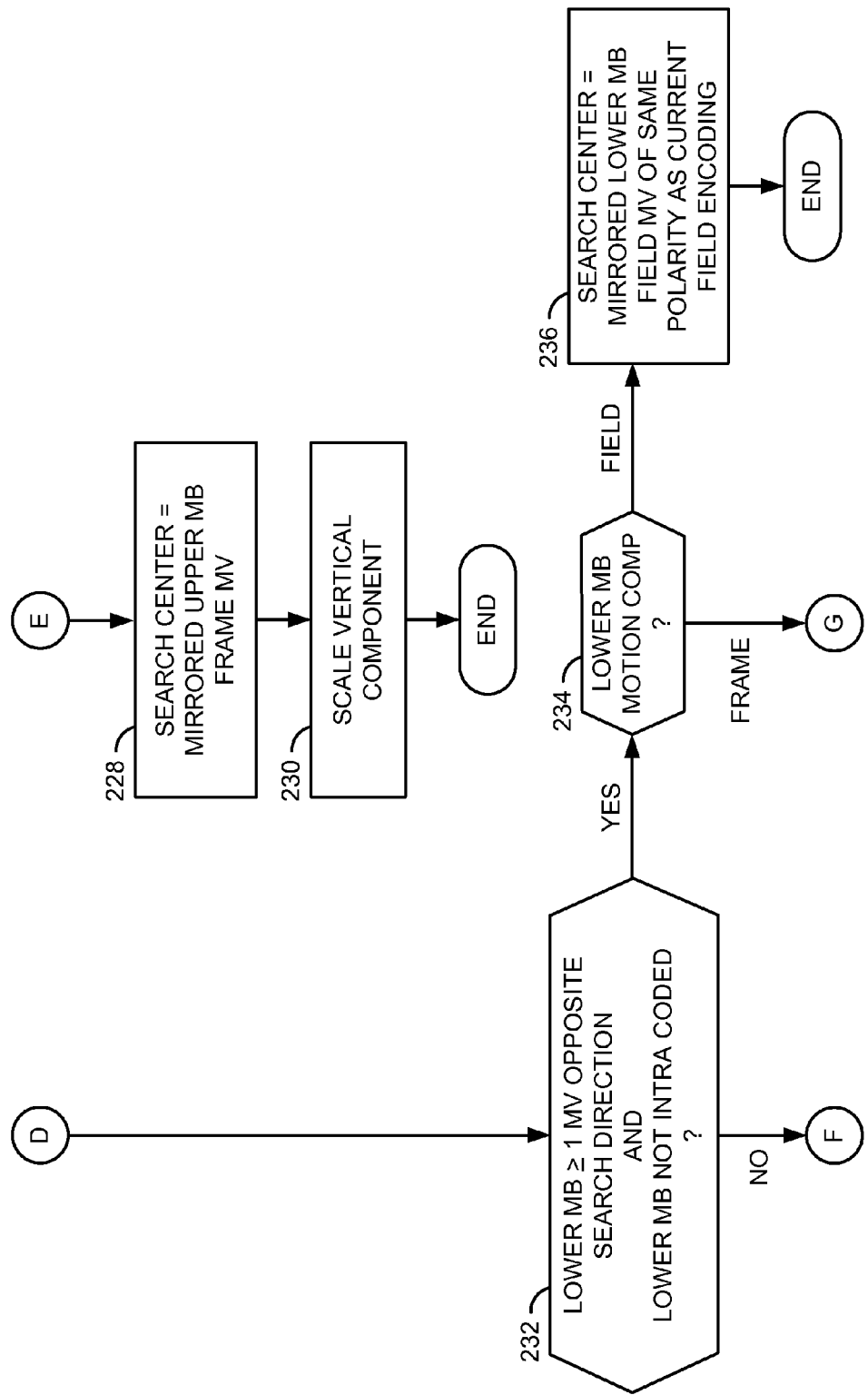
Figure 5E:
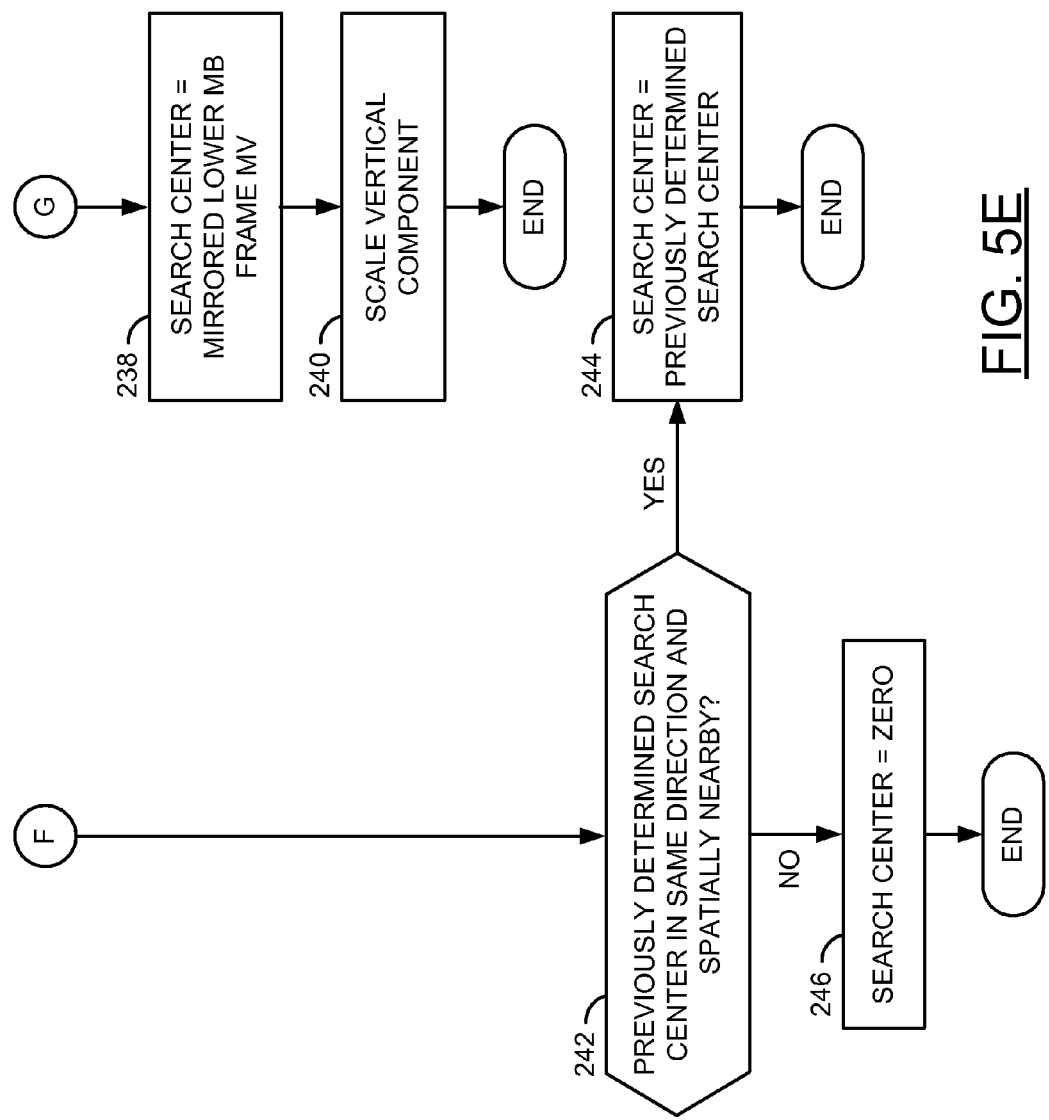

Referring to FIG. 4, a diagram of an example mapping 160 of macroblock pairs from a frame picture decoding to a field picture encoding is shown. A starting set of MPEG-2 macroblocks 162a-162b may be decoded from an interlaced frame 164 carried in the signal IN. An ending set of H.264 macroblocks 166a-166b may be encoded as field pictures 168 and 170. Each macroblock row 174a-174d of the MPEG-2 macroblocks generally contains 8 luminance (luma) top field lines and 8 luma bottom field lines. Two MPEG-2 macroblocks (e.g., 162a and 162b) may be mapped to two H.264 macroblocks (e.g., 166a and 166b) of the fields 168 and 170 respectively.

Each of the H.264 macroblocks in the field pictures 168 and 170 are partially mapped to each of the MPEG-2 macroblocks in a pair (e.g., 172a and 172b) of the MPEG-2 macroblocks from consecutive rows 174a-174d in the decoded MPEG-2 interlaced frame picture. For example, a macroblock (e.g., 166a) in row N (e.g., 176a) of the H.264 top field picture 168 generally maps to the top field lines in the pair 172b of MPEG-2 macroblocks 162a and 162b located in rows 2N (e.g., 174a) and 2N+1 (e.g., 174b) of the MPEG-2 interlaced frame 164. The macroblock (e.g., 166b) in the same location (e.g., 176b) in the H.264 bottom field picture 170 generally maps to the bottom field lines of the same two MPEG-2 macroblocks 162a and 162b in the MPEG-2 interlaced frame 164.

Because of the 2 to 1 mapping of macroblocks from the MPEG-2 interlaced frame to the H.264 fields, up to twice the number of MPEG-2 input vectors may be available as candidate search centers for the H.264 macroblocks than in a case of encoding an H.264 frame picture. The following rules may be applied in an order specified below to select a search center for each H.264 macroblock from the MPEG-2 motion vectors of the two corresponding MPEG-2 macroblocks.

Referring to FIGS. 5A-5E, a flow diagram of an example method 180 of selecting search centers for field encoding is shown. The method (or process) 180 may be implemented as a set of rules. The method 180 generally comprises a step (or block) 182, a step (or block) 184, a step (or block) 186, a step (or block) 188, a step (or block) 190, a step (or block) 192, a step (or block) 194, a step (or block) 196, a step (or block) 198, a step (or block) 200, a step (or block) 202, a step (or block) 204, a step (or block) 206, a step (or block) 208, a step (or block) 210, a step (or block) 212, a step (or block) 214, a step (or block) 216, a step (or block) 218, a step (or block)

220, a step (or block) 222, a step (or block) 224, a step (or block) 226, a step (or block) 228, a step (or block) 230, a step (or block) 232, a step (or block) 234, a step (or block) 236, a step (or block) 238, a step (or block) 240, a step (or block) 242 a step (or block) 244 and a step (or block) 246.

In the step 182, the conditions of the transcode may be examined. In a special case of an H.264 P-field search in a second field from an MPEG-2 frame where a first field of the same MPEG-2 frame is the reference picture (e.g., the YES branch of step 182), an MPEG-2 motion vector from either the upper MPEG-2 macroblock or the lower MPEG-2 macroblock may be determined to be the basis for computing the search center in the step 184. The selected MPEG-2 motion vector may be scaled down in the step 186 by dividing both a horizontal component and a vertical component of the vector by a number of fields between subsequent MPEG-2 reference frames, or some simplified approximation of the division process.

If the special case does not exist (e.g., the NO branch of step 182), the MPEG-2 macroblocks are checked in the step 188. If the upper MPEG-2 macroblock contains at least one MPEG-2 motion vector in the same temporal direction as the current search direction and the lower MPEG-2 macroblock does not (e.g., the YES branch of step 188), the motion compensation of the upper MPEG-2 macroblock is examined in the step 190. If the upper MPEG-2 macroblock uses a field motion compensation (e.g., the FIELD branch of step 190), the MPEG-2 motion vector for the field lines in the upper MPEG-2 macroblock that match the polarity of the current H.264 field being encoded (e.g., odd field lines or even field lines) may be used as the search center in the step 192. If the upper MPEG-2 macroblock uses a frame motion compensation (e.g., the FRAME branch of step 190), an MPEG-2 frame motion vector from the upper MPEG-2 macroblock may be identified as the search center per step 194. In the step 196, a vertical component of the search center (e.g., MPEG-2 frame motion vector) may be divided by 2 to convert into field units.

When the condition of step 188 does not exist (e.g., the NO branch of step 188) and both (i) the lower MPEG-2 macroblock contains one or more MPEG-2 motion vectors in the search direction and (ii) the upper MPEG-2 macroblock does not (e.g., the YES branch of step 198), the motion compensation mode of the lower MPEG-2 macroblock may be checked in the step 200. If the lower MPEG-2 macroblock uses the field motion compensation (e.g., the FIELD branch of step 200), the MPEG-2 motion vector for the field lines of the lower MPEG-2 macroblock that match the polarity of the current H.264 field may be used as the search center in the step 202. If the lower MPEG-2 macroblock uses the frame motion compensation (e.g., the FRAME branch of step 200), a frame motion vector of the lower MPEG-2 macroblock may be used as the search center per the step 204. The vertical component of the search center (e.g., MPEG-2 frame motion vector) may be divided by 2 in the step 206 to convert to field units.

If both the upper MPEG-2 macroblock and the lower MPEG-2 macroblock contain MPEG-2 motion vectors in the current search direction (e.g., the NO branch of step 198 and the YES branch of step 208), the motion compensation of the upper MPEG-2 macroblock may be inspected in the step 210. If the upper MPEG-2 macroblock uses the field motion compensation (e.g., the FIELD branch of step 210), the MPEG-2 motion vector for the field lines of the upper MPEG-2 macroblock that match both (i) the polarity of the current H.264 field being encoded and (ii) the current search direction may be used as the search center in the step 212. If the upper MPEG-2 macroblock uses the frame motion compensation (e.g., the FRAME branch of step 210), the motion compensation of the lower MPEG-2 macroblock may be checked in step 214.

If the lower MPEG-2 macroblock uses the field motion compensation (e.g., the FIELD branch of step 214), the MPEG-2 motion vector for the field lines that match both (i) the polarity of the current H.264 field and (ii) the current search direction may be used as the search center per the step 216. If the lower MPEG-2 macroblock also uses the frame motion compensation (e.g., the FRAME branch of step 214), the MPEG-2 frame motion vector from the upper MPEG-2 macroblock may be designated as the search center in the step 218. In some embodiments, the MPEG-2 frame motion vector from the lower MPEG-2 macroblock may be used as the search center. In the step 220, the vertical component of the search center may be divided by 2 to convert to field units.

When no MPEG-2 motion vectors exist in the search direction (e.g., the NO branch of step 208), a check may be made for one or more MPEG-2 motion vectors in the upper MPEG-2 macroblock in an opposite direction from the search direction in the step 222. If the upper MPEG-2 macroblock is (i) not intra coded and (ii) contains an MPEG-2 motion vector in the opposite direction as the search direction (e.g., the YES branch of step 222), the motion compensation mode of the upper MPEG-2 macroblock may be checked in the step 224. If the upper MPEG-2 macroblock uses the field motion compensation (e.g., the FIELD branch of step 224), the search center may be set to match a mirrored MPEG-2 field motion vector matching the polarity of the current H.264 field in the step 226. Mirroring generally comprises inverting the motion vector by multiplying both of the horizontal component and the vertical component by −1. If the upper MPEG-2 macroblock uses frame motion compensation (e.g., the FRAME branch of step 224), the search center may be determined as a mirrored MPEG-2 frame motion vector in the step 228. In the step 230, the vertical component of the mirrored motion vector may be divided by 2 to convert to field units.

If the upper MPEG-2 macroblock uses intra coding (e.g., the NO branch of step 222) and if the lower MPEG-2 macroblock is both (i) not intra coded and (ii) contains an MPEG-2 motion vector in the opposite direction as the search direction (e.g., the YES branch of step 232), the motion compensation of the lower MPEG-2 macroblock may be examined in the step 234. If the lower MPEG-2 macroblock uses field motion compensation (e.g., the FIELD branch of step 234), the search center may be generated by inverting (e.g., multiplying both the horizontal component and the vertical component by −1) the MPEG-2 field motion vector of the lower MPEG-2 macroblock having the said same polarity as the current H.264 field in the step 236. If the lower MPEG-2 macroblock uses frame motion compensation (e.g., the FRAME branch of step 234), the search center may be determined as the mirrored MPEG-2 frame motion vector of the lower MPEG-2 macroblock in the step 238. In the step 240, the vertical component of the search center may be divided by 2 to convert to field units.

When no MPEG-2 motion vectors exist in either of the MPEG-2 macroblocks (e.g., the NO branch of step 232), both macroblocks may be intra coded macroblocks. In the step 242, the neighboring MPEG-2 macroblocks may be checked for a previously determined search center in the search direction.

Figure 6:
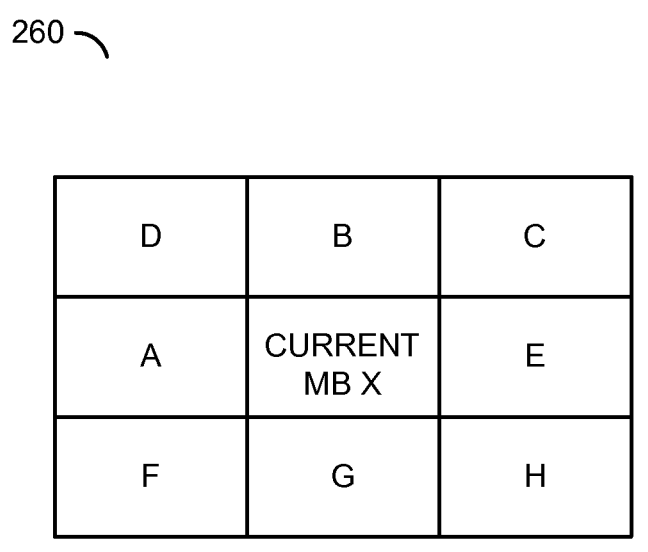

Referring to FIG. 6, a block diagram of an example layout 260 of multiple macroblocks in a raster scan order is shown. A current macroblock (e.g., center MB X) may be surrounded by several other macroblocks, labeled A-H respectively. Returning to FIG. 5E, the step 242 may first check one or more previous determined search centers from one or more macroblock locations spatially near the current macroblock X. The checking may be performed in a quasi raster-scan order or in a raster scan order. For example, the checking may sequence starting from the location of MB A to MB B, MB C and then MB D. Depending on how the picture is being decoded, the other neighboring macroblock locations (e.g., MB E, MB F, MB G and/or MB H) may also be checked for a previously determined search center. Other sequences may be implemented to meet the criteria of a particular application.

If a suitable previous determined search center is found in the same direction as the search direction (e.g., the YES branch of step 242), the search center may be defined in the step 244 as the suitable previously determined search center. If no useable search centers exist in the decoded MPEG-2 frame (e.g., at the start of the frame), a zero motion vector may be used as the search center per the step 246.

Figure 7A:
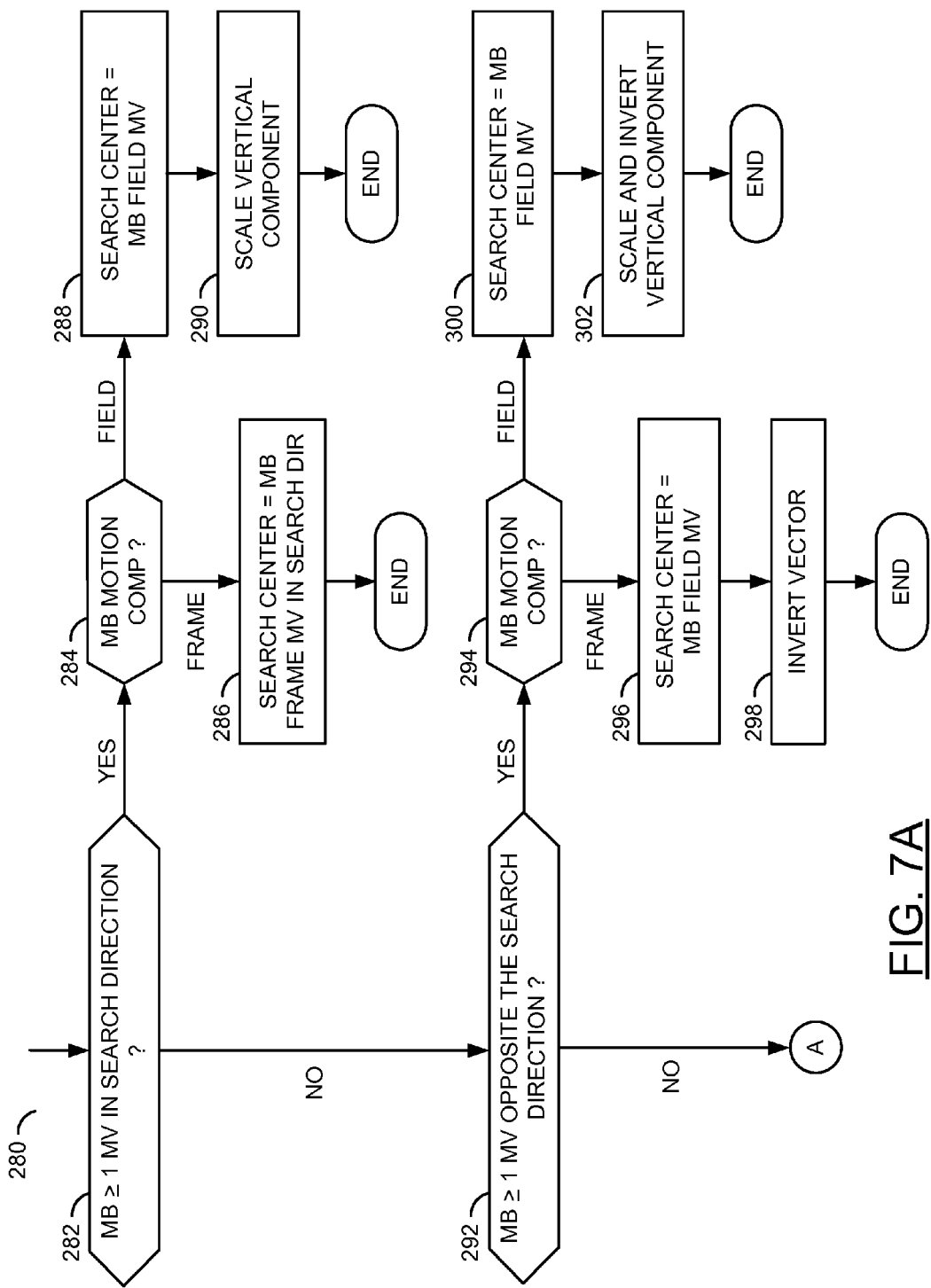
FIGS. 7A-7B are a flow diagram of an example method of selecting search centers for frame encoding.
Figure 7B:
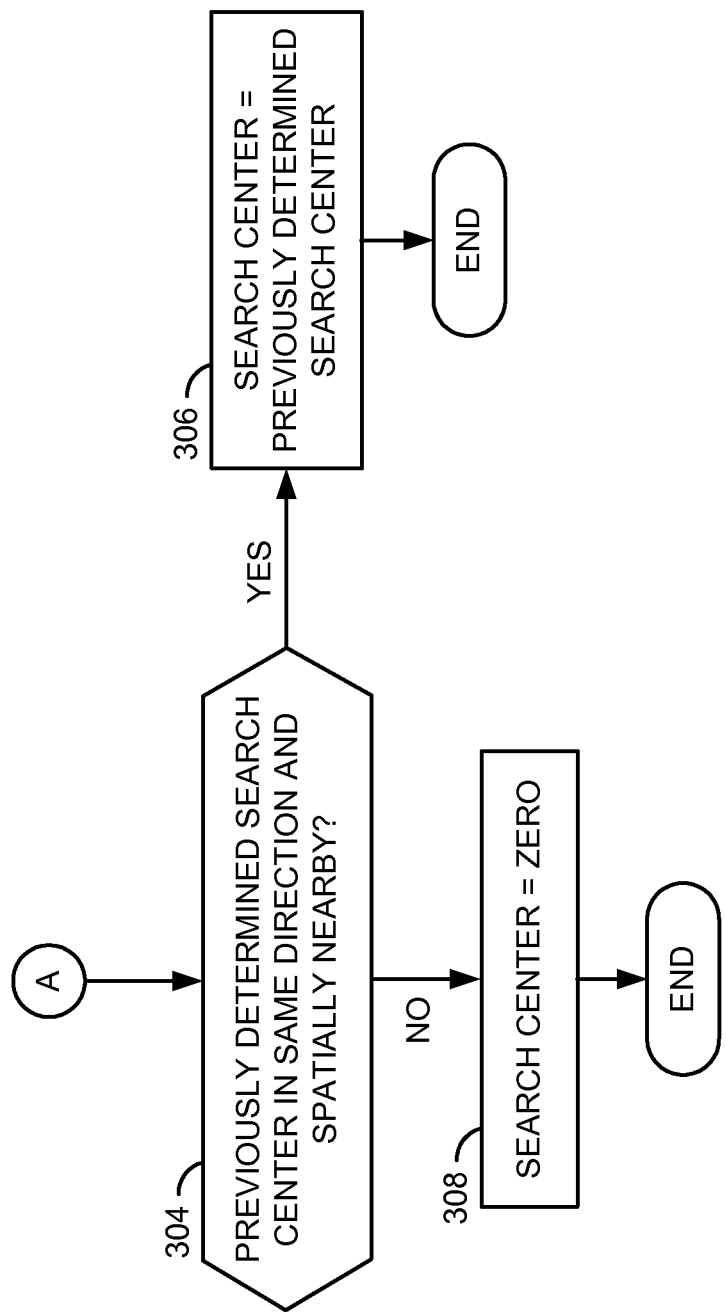

Referring to FIGS. 7A-7B, a flow diagram of an example method 280 of selecting search centers for frame encoding is shown. For progressive picture H.264 encoding, each H.264 macroblock generally maps to a single MPEG-2 macroblock. The method (or process) 280 may be implemented as a set of rules. The rules may be applied in the order specified below to select the search center for each H.264 macroblock, using the MPEG-2 motion vectors from the corresponding MPEG-2 macroblock as input. The method 280 generally comprises a step (or block) 282, a step (or block) 284, a step (or block) 286, a step (or block) 288, a step (or block) 290, a step (or block) 292, a step (or block) 294, a step (or block) 296, a step (or block) 298, a step (or block) 300, a step (or block) 302, a step (or block) 304, a step (or block) 306 and a step or block 308.

In the step 282, the MPEG-2 macroblock may be checked for MPEG-2 motion vectors. If the MPEG-2 macroblock has at least one MPEG-2 motion vector in the direction of the search (e.g., the YES branch of step 282), one of the MPEG-2 motion vectors of the macroblock may be selected as the search center. In the step 284, the motion compensation of the MPEG-2 macroblock is checked. If the MPEG-2 motion compensation type is frame (e.g., the FRAME branch of the step 284), the MPEG-2 macroblock frame motion vector in the same direction as the search may be designated as the search center in the step 286.

If the MPEG-2 motion compensation type is field (e.g., the FIELD branch of the step 284), two MPEG-2 field motion vectors are generally available, one for a top field and another for a bottom field. The first (e.g., top field) motion vector may be used as the search center per the step 288. In some embodiments, the second (e.g., bottom field) motion vector may be used as the search center. A vertical component of the search center may be multiplied by 2 in the step 290 to convert to frame units.

If no MPEG-2 motion vectors exist in the same direction as the search (e.g., the NO branch of step 282) and an MPEG-2 motion vector exists in the opposite direction as the search (e.g., the YES branch of step 292), the motion compensation of the MPEG-2 macroblock may be checked in the step 294. If the MPEG-2 motion compensation type is frame (e.g., the FRAME branch of step 294), the MPEG-2 macroblock frame motion vector in the opposite direction of the search direction may be selected as the search center in the step 296. In the step 298, the search center vector may be inverted (mirrored) by multiplying each of the horizontal component and the vertical component of the motion vector by −1.

If the MPEG-2 motion compensation type is field (e.g., the FIELD branch of the step 294), the first (e.g., top field) MPEG-2 field motion vector in the opposite direction of the search may be determined to be the search center in the step 300. In some embodiments, a second (e.g., bottom field) MPEG-2 field motion vector may be used as the search center. In the step 302, the search center vector may be inverted and the inverted vertical component multiplied by 2 to convert to frame units.

If no MPEG-2 motion vectors exist in the MPEG-2 macroblock (e.g., the NO branch of step 292), the MPEG-2 macroblock may be an intra coded macroblock. In the step 304, the neighboring MPEG-2 macroblocks may be checked for previously determined search centers in the search direction. If a suitable previously determined search center is found (e.g., the YES branch of the step 304), the search center may be set to the suitable previously determined search center in the step 306. If no useable previously determined search centers exists in the decoded MPEG-2 frame (e.g., at the start of the frame), a zero motion vector may be used as the search center per the step 308.

Figure 8:
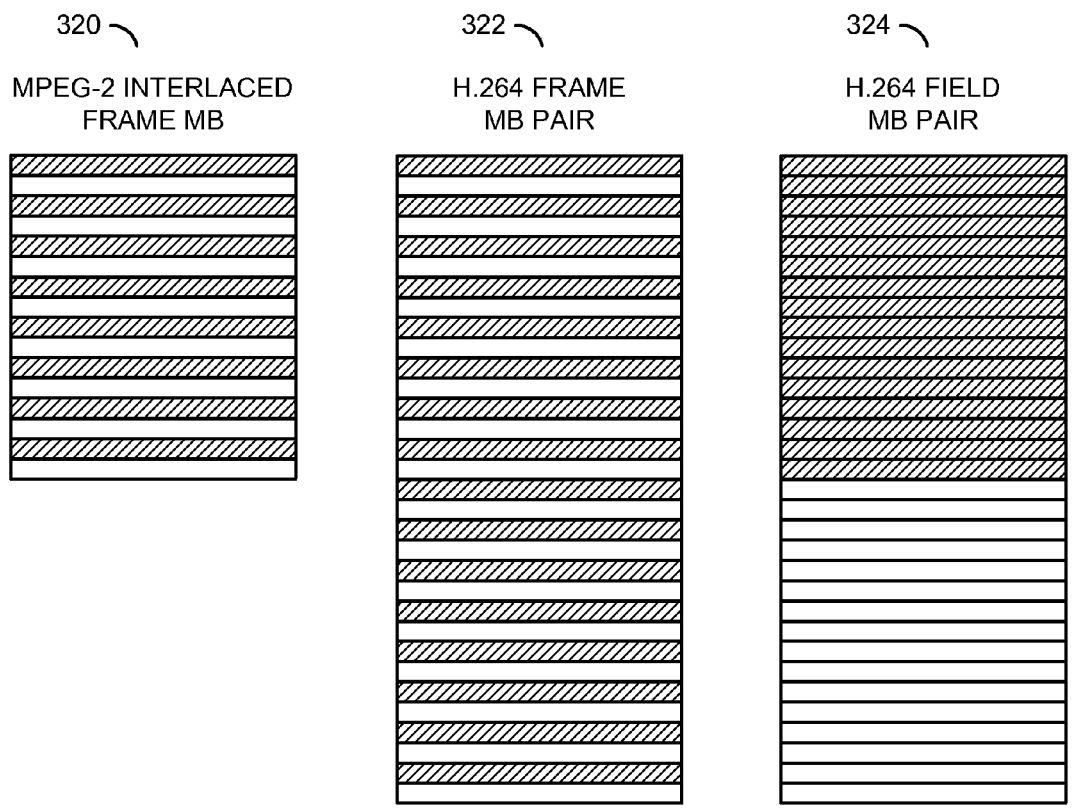
FIG. 8 is a diagram of example MPEG-2 interlaced frame macroblock and H.264 macroblock pairs.
Figure 9A:
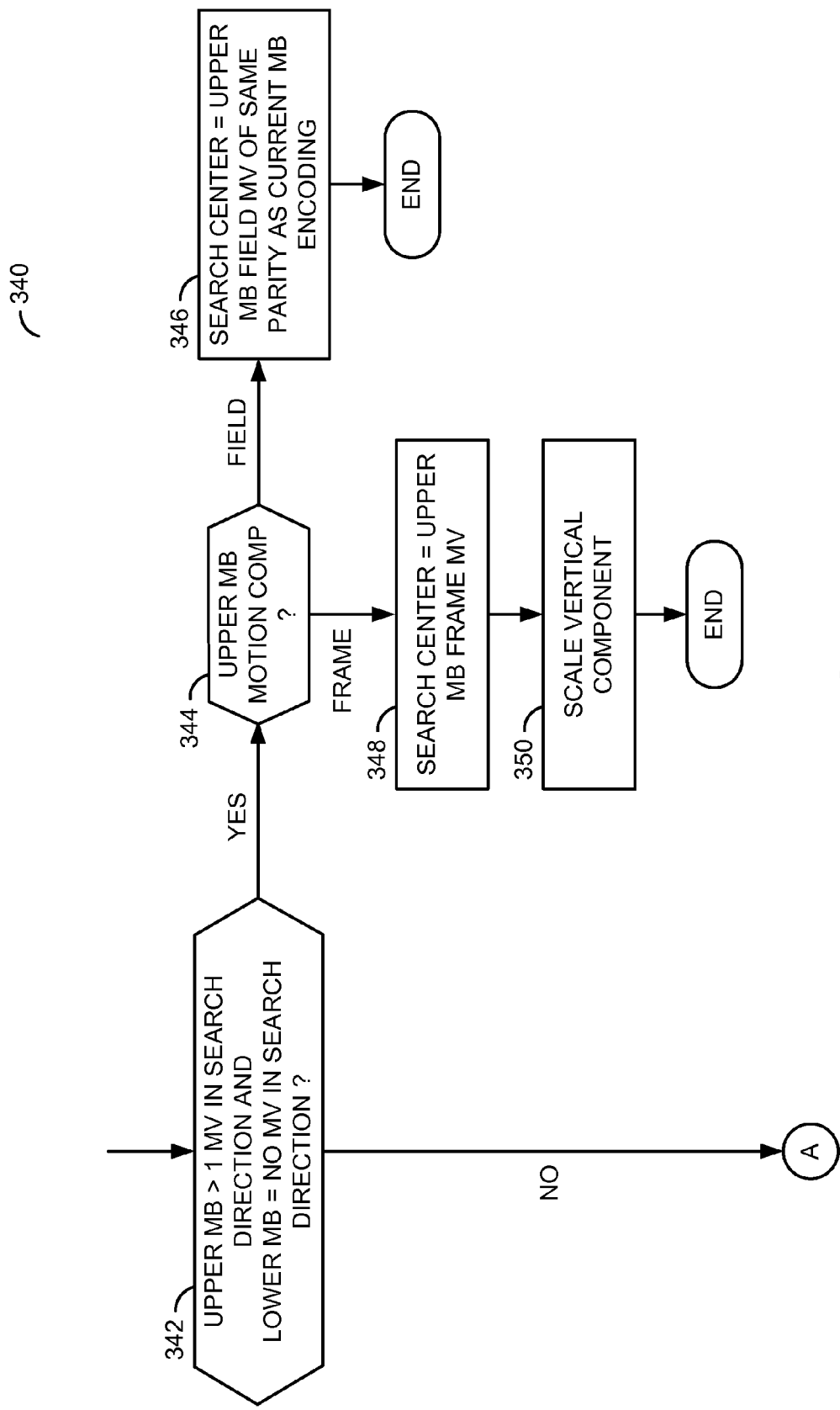
Figure 9C:
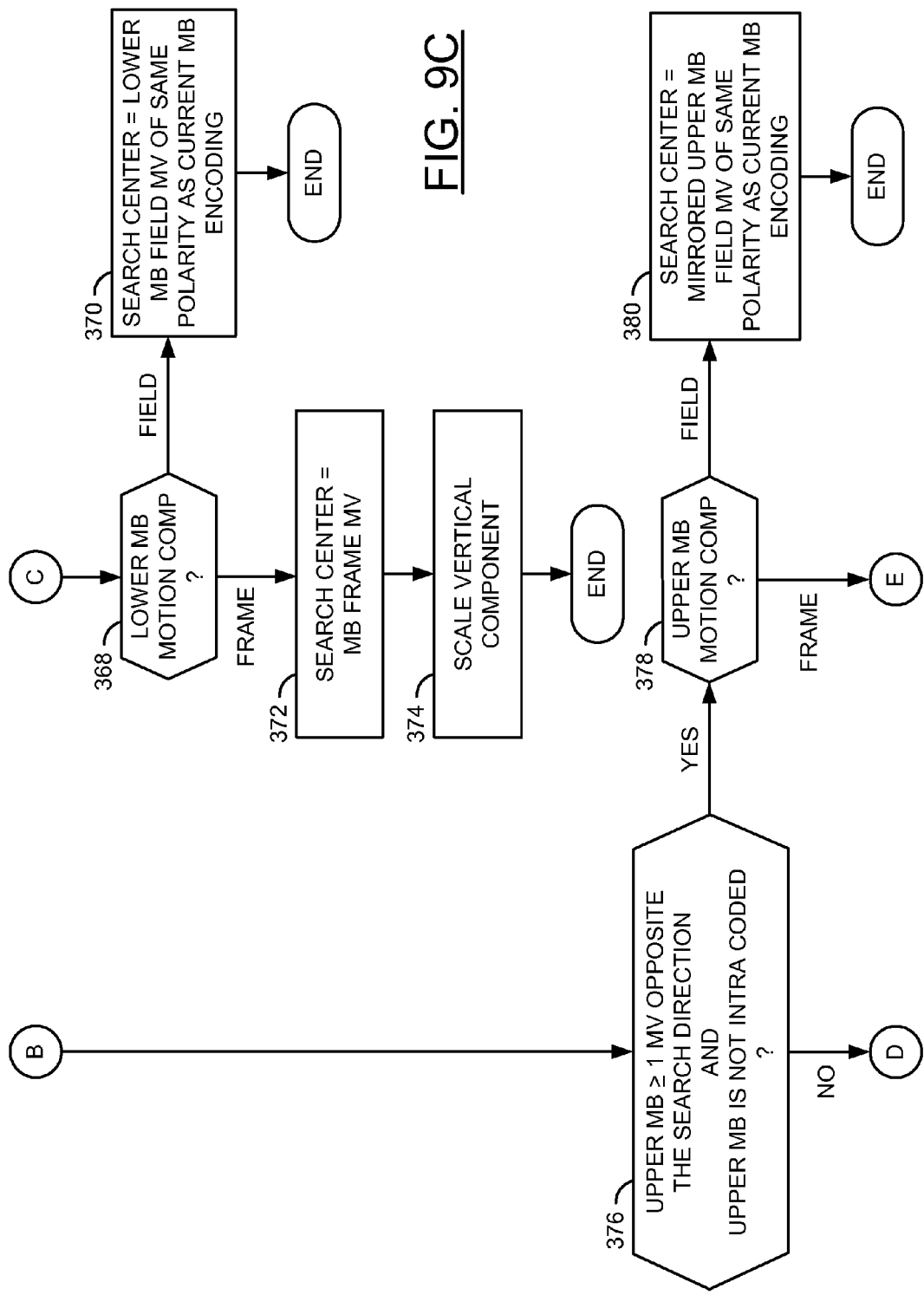
Figure 9D:
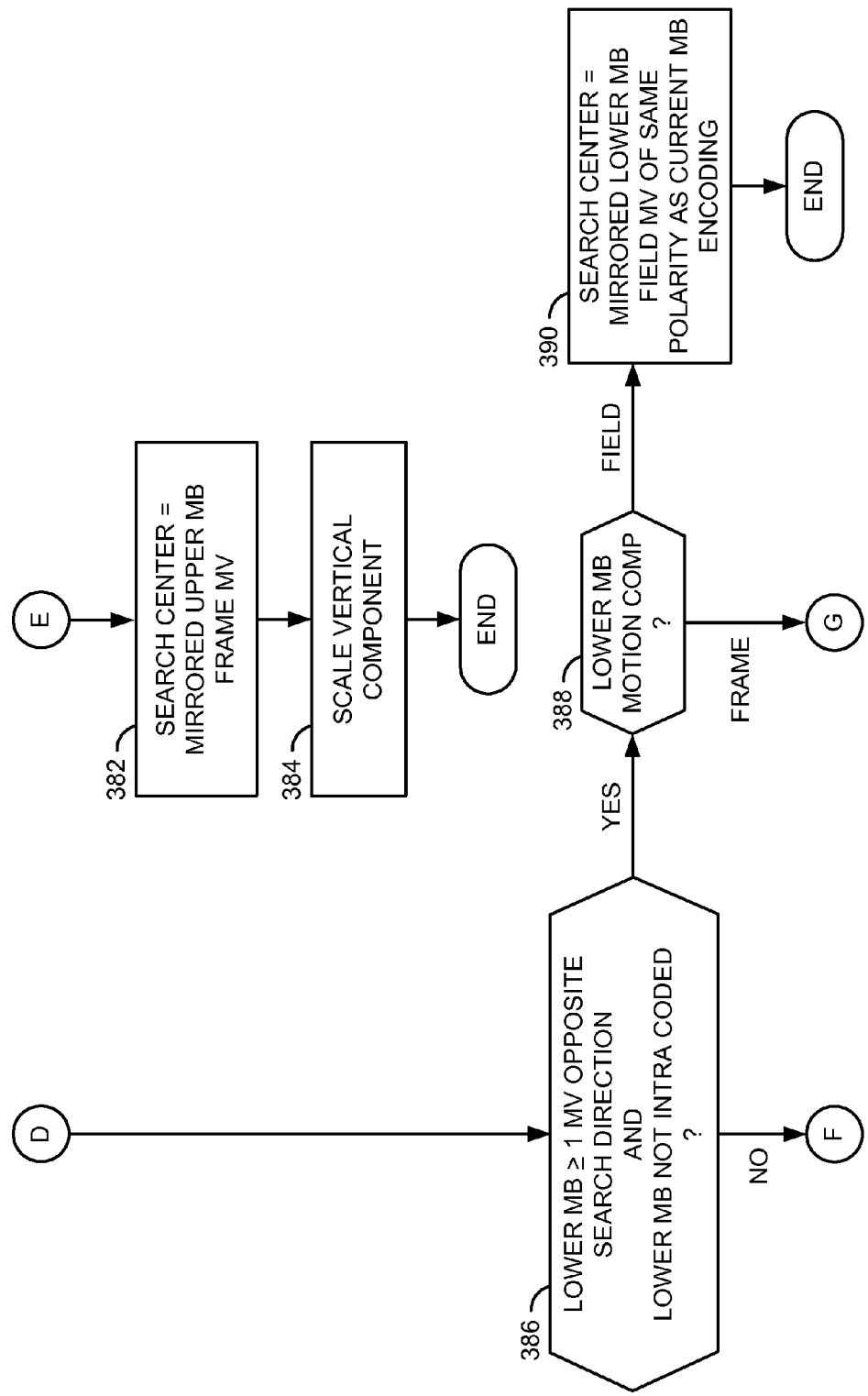
Figure 9E:
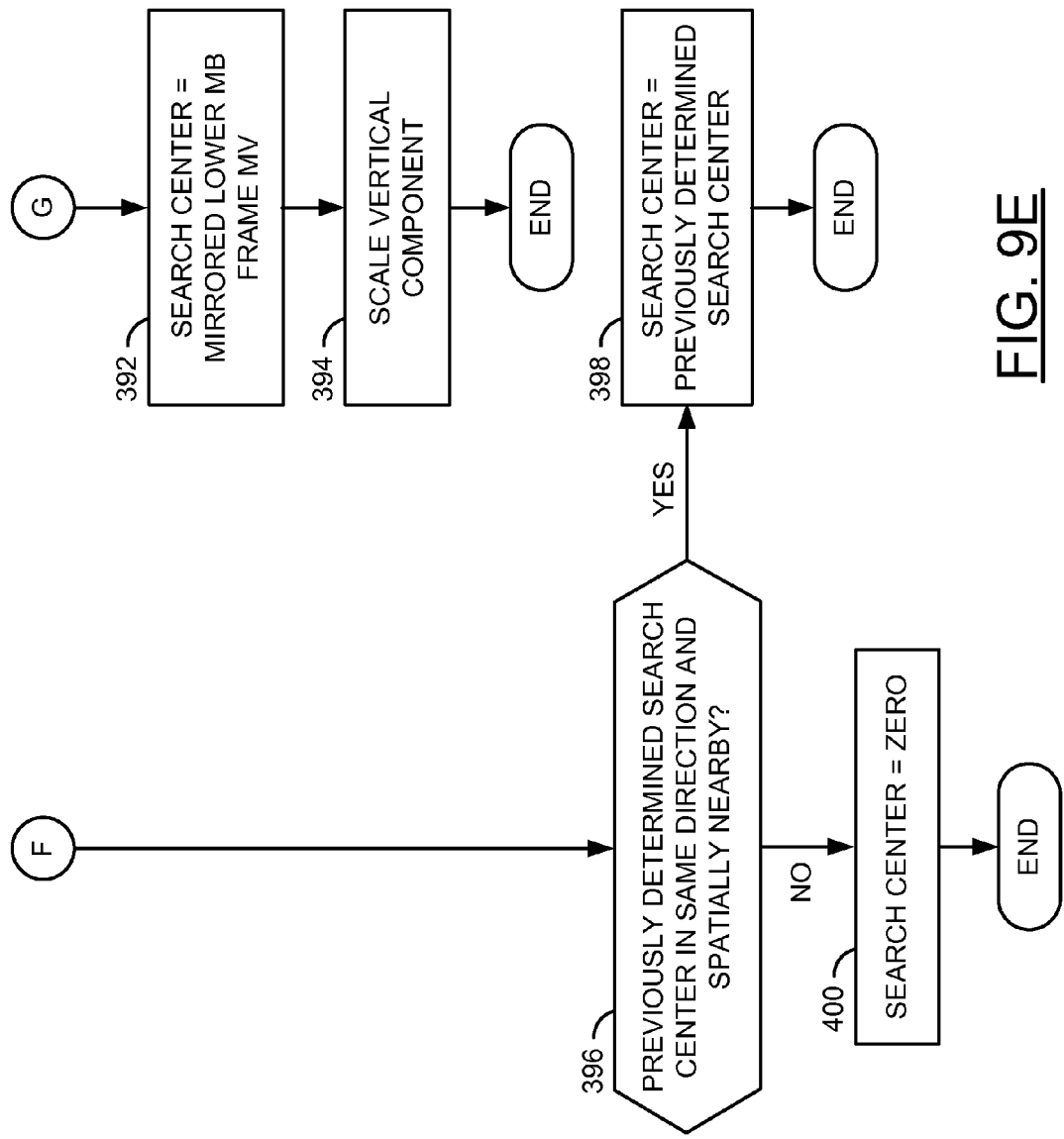

Referring to FIG. 8, a diagram of example MPEG-2 interlaced frame macroblock and H.264 macroblock pairs is shown. Striped lines generally represent top-field samples and white lines generally represent bottom-field samples. A macroblock 320 received via the signal IN may be arranged as an interlaced frame macroblock. Lines from both the top field and the bottom field are generally interlaced and coded together to form the macroblock 320. Motion compensation for the macroblock 320 may be frame-based or field-based.

An H.264 encoding of the interlaced content from MPEG-2 macroblocks may use a macroblock-adaptive field/frame (MBAFF) coding. For MBAFF encoding, the H.264 macroblocks are generally grouped into vertically adjacent pairs (macroblock pairs). Each of the macroblock pairs may be either frame coded (e.g., 322) or field coded (e.g., 324).

The frame coded pairs 322 generally contain two macroblocks, each of which contains interleaved lines from both fields. The lines from both fields may be coded together. Motion compensation for the pair 322 may be frame-based.

For the field coded pairs 324, all of the top field lines from the pair may be coded in a first macroblock and all of the bottom field lines from the pair may be coded in a second macroblock. The top field lines may be coded separately from the bottom field lines. Motion compensation for the macroblocks is generally field-based. Since the choice of (i) field versus frame coding and (ii) motion compensation is selectable on a macroblock-pair-basis, both field-based and frame-based motion estimation may be performed for each H.264 macroblock to be encoded. Thus, search centers for both frame-based motion refinement and field-based motion refinement may be determined.

For transcoding from an MPEG-2 interlaced frame to an H.264 interlaced frame using frame-based motion compensation (e.g., 322), the same rules used for encoding to a progressive H.264 picture may be applied. For an H.264 interlaced frame using field-based motion compensation (e.g., 324), the following rules may be applied in the order specified below to select the search center for each of the H.264 macroblocks. The search centers may use the motion vectors for two corresponding MPEG-2 macroblocks. The following rules are generally similar to the rules used for field picture searching. A difference may be that the polarity of the search target generally changes below on a macroblock basis rather than a field basis.

Referring to FIGS. 9A-9E, a flow diagram of an example method 340 of selecting search centers for macroblock-adaptive field/frame encoding using field-based motion compensation is shown. The method (or process) 340 may be implemented as a set of rules. The method 340 generally comprises a step (or block) 342, a step (or block) 344, a step (or block) 346, a step (or block) 348, a step (or block) 350, a step (or block) 352, a step (or block) 354, a step (or block) 356, a step (or block) 358, a step (or block) 360, a step (or block) 362, a step (or block) 364, a step (or block) 366, a step (or block) 368, a step (or block) 370, a step (or block) 372, a step (or block) 374, a step (or block) 376, a step (or block) 378, a step (or block) 380, a step (or block) 382, a step (or block) 384, a step (or block) 386, a step (or block) 388, a step (or block) 390, a step (or block) 392, a step (or block) 394, a step (or block) 396, a step (or block) 398 and a step (or block) 400.

In the step 342, the MPEG-2 macroblocks may checked. If the upper MPEG-2 macroblock contains at least one MPEG-2 motion vector in the same temporal direction as the current search direction and the lower MPEG-2 macroblock does not (e.g., the YES branch of step 342), the motion compensation of the upper MPEG-2 macroblock is examined in the step 344. If the upper MPEG-2 macroblock uses a field motion compensation (e.g., the FIELD branch of step 344), the MPEG-2 motion vector for the field lines in the upper MPEG-2 macroblock that match the polarity of the current H.264 macroblock being encoded may be used as the search center in the step 346. If the upper MPEG-2 macroblock uses a frame motion compensation (e.g., the FRAME branch of step 344), an MPEG-2 frame motion vector from the upper MPEG-2 macroblock may be identified as the search center per step 348. In the step 350, a vertical component of the search center (e.g., MPEG-2 frame motion vector) may be divided by 2 to convert into field units.

When the upper MPEG-2 macroblock does not have an MPEG-2 motion vector in the current search direction (e.g., the NO branch of step 342) and both (i) the lower MPEG-2 macroblock contains one or more MPEG-2 motion vectors in the search direction and (ii) the upper MPEG-2 macroblock does not (e.g., the YES branch of step 352), the motion compensation mode of the lower MPEG-2 macroblock may be checked in the step 354. If the lower MPEG-2 macroblock uses the field motion compensation (e.g., the FIELD branch of step 354), the MPEG-2 motion vector for the field lines of the lower MPEG-2 macroblock that match the polarity of the current H.264 macroblock may be used as the search center in the step 356. If the lower MPEG-2 macroblock uses the frame motion compensation (e.g., the FRAME branch of step 354), a frame motion vector of the lower MPEG-2 macroblock may be used as the search center per the step 358. The vertical component of the search center (e.g., MPEG-2 frame motion vector) may be divided by 2 in the step 360 to convert to field units.

If both the upper MPEG-2 macroblock and the lower MPEG-2 macroblock contain MPEG-2 motion vectors in the current search direction (e.g., the NO branch of step 352 and the YES branch of step 362), the motion compensation of the upper MPEG-2 macroblock may be inspected in the step 364. If the upper MPEG-2 macroblock uses the field motion compensation (e.g., the FIELD branch of step 364), the MPEG-2 motion vector for the field lines of the upper MPEG-2 macroblock that match both (i) the polarity of the current H.264 macroblock being encoded and (ii) the current search direction may be used as the search center in the step 366. If the upper MPEG-2 macroblock uses the frame motion compensation (e.g., the FRAME branch of step 364), the motion compensation of the lower MPEG-2 macroblock may be checked in step 368.

If the lower MPEG-2 macroblock uses the field motion compensation (e.g., the FIELD branch of step 368), the MPEG-2 motion vector for the field lines that match both (i) the polarity of the current H.264 macroblock and (ii) the current search direction may be used as the search center per the step 370. If the lower MPEG-2 macroblock also uses the frame motion compensation (e.g., the FRAME branch of step 368), the MPEG-2 frame motion vector from the upper MPEG-2 macroblock may be designated as the search center in the step 372. In some embodiments, the MPEG-2 frame motion vector from the lower MPEG-2 macroblock may be used as the search center. In the step 374, the vertical component of the search center may be divided by 2 to convert to field units.

When no MPEG-2 motion vectors exist in the search direction (e.g., the NO branch of step 362), a check may be made for one or more MPEG-2 motion vectors in the upper MPEG-2 macroblock in an opposite direction from the search direction in the step 376. If the upper MPEG-2 macroblock is (i) not intra coded and (ii) contains an MPEG-2 motion vector in the opposite direction as the search direction (e.g., the YES branch of step 376), the motion compensation mode of the upper MPEG-2 macroblock may be checked in the step 378. If the upper MPEG-2 macroblock uses the field motion compensation (e.g., the FIELD branch of step 378), the search center may be set to match a mirrored MPEG-2 field motion vector matching the polarity of the current H.264 macroblock in the step 380. Mirroring generally comprises inverting the motion vector by multiplying both of the horizontal component and the vertical component by −1. If the upper MPEG-2 macroblock uses frame motion compensation (e.g., the FRAME branch of step 378), the search center may be determined as a mirrored MPEG-2 frame motion vector in the step 382. In the step 384, the vertical component of the mirrored motion vector may be divided by 2 to convert to field units.

If the upper MPEG-2 macroblock uses intra coding (e.g., the NO branch of step 376) and if the lower MPEG-2 macroblock is both (i) not intra coded and (ii) contains an MPEG-2 motion vector in the opposite direction as the search direction (e.g., the YES branch of step 386), the motion compensation of the lower MPEG-2 macroblock may be examined in the step 388. If the lower MPEG-2 macroblock uses field motion compensation (e.g., the FIELD branch of step 388), the search center may be generated by inverting (e.g., multiplying both the horizontal component and the vertical component by −1) the MPEG-2 field motion vector of the upper MPEG-2 macroblock having the said same polarity as the current H.264 macroblock in the step 390. If the lower MPEG-2 macroblock uses frame motion compensation (e.g., the FRAME branch of step 388), the search center may be determined as the mirrored MPEG-2 frame motion vector of the lower MPEG-2 macroblock in the step 392. In the step 394, the vertical component of the search center may be divided by 2 to convert to field units.

When no MPEG-2 motion vectors exist in either of the MPEG-2 macroblocks (e.g., the NO branch of step 386), both macroblocks may be intra coded macroblocks. In the step 396, the neighboring MPEG-2 macroblocks may be checked for a previously determined search center in the search direction. If a suitable previous determined search center is found in the same direction as the search direction (e.g., the YES branch of step 396), the search center may be defined in the step 398 as the suitable previously determined search center. If no useable search centers exist in the decoded MPEG-2 frame (e.g., at the start of the frame), a zero motion vector may be used as the search center per the step 400.

The present invention generally provides a low-complexity, high-quality MPEG-2 to H.264 transcoding by using the MPEG-2 motion vector and coding mode information to seed motion estimation refinement for H.264 encoding. Specific rules and rule sequences may be applied in determining a best search center to use in refining the motion vectors to use in the H.264 encoding.

The function performed by the diagrams of FIGS. 4-9E may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for transcoding, comprising the steps of:
 (A) generating a decoded frame by decoding an input video stream in an MPEG-2 format, said decoded frame including a plurality of decoded macroblocks;
 (B) determining a current search center to be used in encoding a current macroblock into an H.264 format, said current macroblock corresponding to a particular one of said decoded macroblocks, wherein when said particular macroblock has an intra-prediction, (i) said current search center comprises a previously determined search center that temporally matches a temporal search direction and (ii) said previously determined search center is spatially adjoining said particular macroblock;
 (C) generating a refined motion vector by searching in said temporal search direction about said current search center; and
 (D) generating an output video stream in said H.264 format by said encoding of said current macroblock based on said refined motion vector, wherein said encoding into said H.264 format utilizes macroblock adaptive field/frame encoding.

2. The method according to claim 1, wherein in step (B) when said particular macroblock has (i) at least one motion vector matching said temporal search direction and (ii) and a frame motion compensation, said current search center comprises a frame motion vector of said particular macroblock.

3. The method according to claim 1, wherein in step (B) when said particular macroblock has (i) at least one motion vector matching said temporal search direction and (ii) and a field motion compensation, said current search center comprises a vertically scaled version of a field motion vector of a top field of said particular macroblock.

4. The method according to claim 1, wherein in step (B) when said particular macroblock has (i) no motion vectors matching said temporal search direction, (ii) at least one motion vector opposite said temporal search direction and (iii) a frame motion compensation, said current search center comprises a mirrored version of a frame motion vector of said particular macroblock.

5. The method according to claim 1, wherein in step (B) when said particular macroblock has (i) no motion vectors matching said temporal search direction, (ii) at least one motion vector opposite said temporal search direction and (iii) a field motion compensation, said current search center comprises a scaled and mirrored version of a field motion vector of a top field of said particular macroblock.

6. A system comprising:
 a decoder circuit configured to generate a decoded frame by decoding an input video stream in an MPEG-2 format, said decoded frame including a plurality of decoded macroblocks; and
 an encoder circuit configured to (i) determine a current search center to be used in encoding a current macroblock into an H.264 format, said current macroblock corresponding to a particular one of said decoded macroblocks, wherein when said particular macroblock has an intra-prediction, (a) said current search center comprises a previously determined search center that temporally matches a temporal search direction and (b) said previously determined search center is spatially adjoining said particular macroblock, (ii) generate a refined motion vector by searching in said temporal search direction about said current search center and (iii) generate an output video stream in said H.264 format by said encoding of said current macroblock based on said refined motion vector, wherein said encoding into said H.264 format utilizes macroblock adaptive field/frame encoding.

* * * * *